(No Model.)
A. H. EDDY.
COMMUTATOR FOR MAGNETO ELECTRIC MACHINES.
No. 257,566. Patented May 9, 1882.
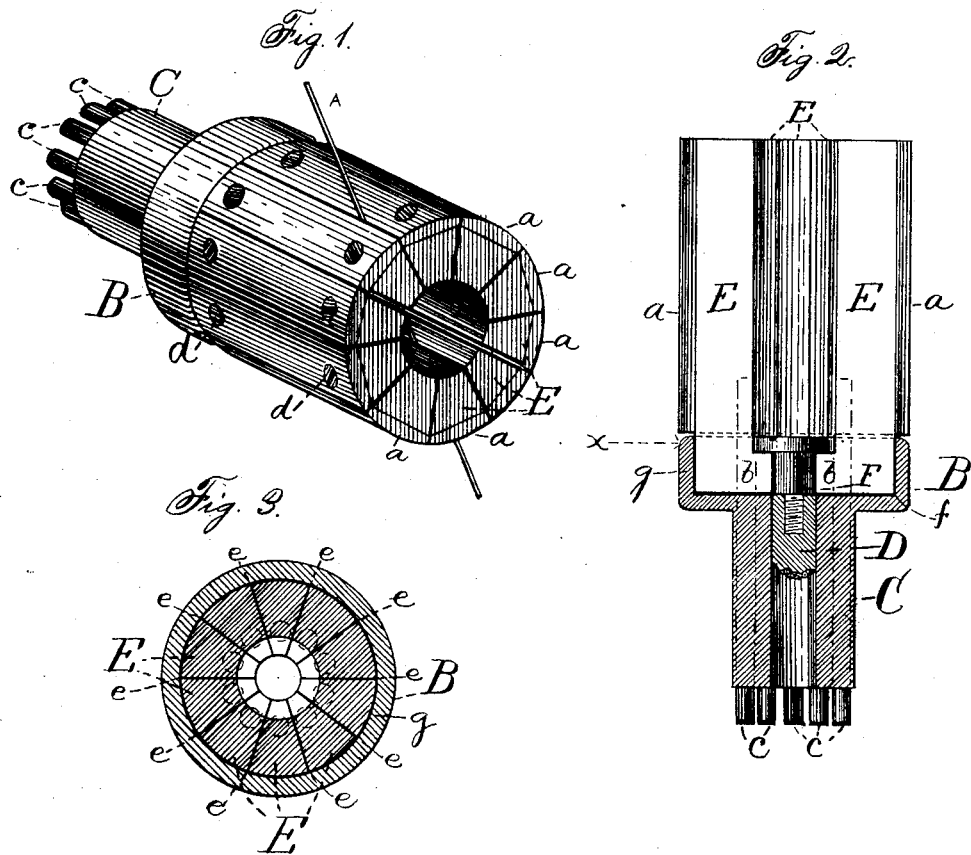

UNITED STATES PATENT OFFICE.

ARTHUR H. EDDY, OF HARTFORD, CONNECTICUT.

COMMUTATOR FOR MAGNETO-ELECTRIC MACHINES.

SPECIFICATION forming part of Letters Patent No. 257,566, dated May 9, 1882.

Application filed February 10, 1882. (No model.)

*To all whom it may concern:*

Be it known that I, ARTHUR H. EDDY, of Hartford, in the county of Hartford and State of Connecticut, have invented certain new and useful Improvements in Commutators for Magneto-Electric Machines, of which the following is a specification.

My invention relates to commutators for magneto-electric machines in which open and unobstructed spaces extend transversely through the commutator, and in which the parts are constructed and put together in a peculiar manner; and the objects of my improvements are to so construct the parts that they shall be very firm and substantial, while at the same time they may be produced at a less cost than formerly, and to arrange the screws which hold the copper strips in place, so that they can be conveniently removed after the strips are worn out. I attain these objects by the mechanism illustrated in the accompanying drawings, in which—

Figure 1 is a perspective view. Fig. 2 is a longitudinal section. Fig. 3 is a transverse section on the line $x$ of Fig. 2; and Fig. 4 is a detached transverse section, partly in elevation.

B designates a recessed head formed on the end of sleeve C, which revolves with and is mounted on the shaft D, Fig. 2. Said shaft is shown as broken off, but it may be extended to any desired length. The commutator-strips are formed of two parts—the body E, preferably of tough white-metal, and the wearing-plates $a$, of copper. The inner ends of the bodies are shouldered upon the inside, as shown at $b$, Figs. 2 and 4, and they are also provided with the usual rods, $c$, firmly secured thereto, and extending, when in place, through holes in the sleeve C. The confronting sides of the body E and wearing-plate $a$ of each strip are made flat, as shown most clearly in Fig. 4, instead of being on the arc of a circle. The screws $d$, which hold said parts together, are made with quite a long head having a deep slot, and are sunk well into the plates $a$, so that as the plates, together with the screw-heads, wear away to such an extent that the plates are substantially worn out, as indicated by the curved broken line in Fig. 4, there will still be a sufficient portion of the slotted screw-head left to enable the screws to be readily removed with an ordinary screw-driver preparatory to removing the plates and replacing them with new ones.

The wearing-plates $a$ do not extend the whole length of the bodies E, but stop a little short of the sleeve C, as shown. The sides of the bodies of these strips are formed on radial lines, as most clearly shown in Fig. 3, and that portion of them which receives the plates $a$ is made of a little less thickness than is the portion which enters the head B. After the parts are thus formed the ends of the strips E $a$ are put together with paper $e$, Fig. 3, or other proper insulator, between the several strips, which, when taken collectively, are of a cylindrical form, and of a size which will substantially fill the recess in the head B. The bottom of the recess has an insulator in the form of a perforated disk, $f$, Fig. 2, placed in it, and another insulator, $g$, Figs. 2 and 3, encircles all of the strips. They are then forced into the recess in the head B, as shown, with sufficient force to make them stay firmly in place. A bolt, F, the body of which is insulated, is then screwed into the shaft D, with its head resting upon the shoulders $b$, to further secure the strips in place. This construction leaves the main portion of the commutator hollow and free from all axial obstructions, while the strips are disconnected, so as to leave open and unobstructed spaces extending transversely through the commutator for the whole length of the wearing-plates, against which the brushes bear, so that the commutator may be very conveniently cleaned every day without taking it apart. The spaces between the strips can be cleaned by passing a string or wire, A, back and forth through said spaces, as shown in Fig. 1.

I do not claim as my invention a commutator having the open unobstructed spaces between its strips extending from side to side and across its axis, as the same was previously invented by another, but of a different construction from that herein shown and described, except in its general form and in the particular herein disclaimed.

I claim as my invention—

1. In a commutator, the combination of the several insulated strips and the recessed head, into which they are forced and by which they are held together, substantially as described, and for the purpose specified.

2. In a commutator, the combination of the recessed head, the several strips having the shoulder $b$, the bolt F, and shaft D, substantially as described, and for the purpose specified.

3. In a commutator-strip, the body E and wearing-plate $a$, having their confronting sides made flat, as shown, and having the head of the deeply-slotted screw $d$ sunk into the strip $a$ nearly to the flat side of said strip, substantially as described, and for the purpose specified.

ARTHUR H. EDDY.

Witnesses:
JAMES SHEPARD,
JOHN EDWARDS, Jr.